United States Patent
Stoksik et al.

(10) Patent No.: US 10,542,319 B2
(45) Date of Patent: Jan. 21, 2020

(54) END-OF-SHOW CONTENT DISPLAY TRIGGER

(71) Applicant: OpenTV, Inc., San Francisco, CA (US)

(72) Inventors: Marc Stoksik, Palo Alto, CA (US); Danielle Maslow Zimmerman, East Palo Alto, CA (US); David Daniel Kempe, San Jose, CA (US)

(73) Assignee: OPENTV, INC., San Francisco, CA (US)

( * ) Notice: Subject to any disclaimer, the term of this patent is extended or adjusted under 35 U.S.C. 154(b) by 0 days.

(21) Appl. No.: 15/347,476

(22) Filed: Nov. 9, 2016

(65) Prior Publication Data

US 2018/0132002 A1 May 10, 2018

(51) Int. Cl.
| | |
|---|---|
| H04N 21/466 | (2011.01) |
| H04N 21/482 | (2011.01) |
| H04N 21/845 | (2011.01) |
| H04N 21/422 | (2011.01) |
| H04N 21/442 | (2011.01) |
| H04N 21/458 | (2011.01) |
| H04N 21/472 | (2011.01) |

(52) U.S. Cl.
CPC ... *H04N 21/4668* (2013.01); *H04N 21/42204* (2013.01); *H04N 21/44218* (2013.01); *H04N 21/44222* (2013.01); *H04N 21/458* (2013.01); *H04N 21/47217* (2013.01); *H04N 21/4826* (2013.01); *H04N 21/8456* (2013.01)

(58) Field of Classification Search
CPC ....... H04N 21/42204; H04N 21/47217; H04N 21/4826; H04N 21/8456; H04N 21/4668; H04N 21/44218; H04N 21/44222; H04N 21/458

USPC .......................................................... 725/10
See application file for complete search history.

(56) References Cited

U.S. PATENT DOCUMENTS 9,465,996 B1 * 10/2016 Greene .............. H04N 21/4334
2003/0126600 A1    7/2003 Heuvelman
(Continued)

FOREIGN PATENT DOCUMENTS

CN        110036645 A    7/2019

OTHER PUBLICATIONS

"International Application Serial No, PCT/US2017/060660, International Search Report dated Jan. 5, 2018", 5 pgs.
(Continued)

*Primary Examiner* — Cynthia M Fogg
(74) *Attorney, Agent, or Firm* — Schwegman Lundberg & Woessner, P.A.

(57) ABSTRACT

Example embodiments provide a system and method for dynamically triggering display of recommendations during an end-of-show period. A digital receiver identifies an end-of-show period for a piece of digital content. The end-of-show period indicates a portion at an end of the piece of digital content during which display of recommendations can be triggered. The digital receiver monitors for a motion indication signal from a remote control device. In response to both playback of the piece of digital content being within the end-of-show period and a determination that the motion indication signal is received, the digital receiver causes immediate display of one or more recommendations of further digital content.

20 Claims, 6 Drawing Sheets

(56) References Cited

U.S. PATENT DOCUMENTS

| | | | |
|---|---|---|---|
| 2004/0128691 A1* | 7/2004 | Egawa | H04N 7/17318 |
| | | | 725/88 |
| 2007/0169148 A1* | 7/2007 | Oddo | H04N 5/44543 |
| | | | 725/46 |
| 2008/0271078 A1* | 10/2008 | Gossweiler | H04N 5/44543 |
| | | | 725/40 |
| 2008/0319852 A1* | 12/2008 | Gardner | G06Q 30/02 |
| | | | 705/14.4 |
| 2010/0094866 A1 | 4/2010 | Cuttner et al. | |
| 2013/0081081 A1 | 3/2013 | Wang | |
| 2013/0339998 A1* | 12/2013 | Arme | H04N 21/4668 |
| | | | 725/32 |
| 2014/0115620 A1 | 4/2014 | Volovich et al. | |
| 2014/0189751 A1* | 7/2014 | Deiss | H04H 60/82 |
| | | | 725/59 |
| 2014/0208219 A1* | 7/2014 | Kim | H04N 21/422 |
| | | | 715/738 |
| 2014/0277648 A1 | 9/2014 | Chong et al. | |
| 2015/0264432 A1* | 9/2015 | Cheng | H04N 21/44218 |
| | | | 725/10 |
| 2015/0370818 A1* | 12/2015 | Des Jardins | G06F 17/30029 |
| | | | 707/734 |
| 2017/0068511 A1* | 3/2017 | Brown | G06F 3/167 |

OTHER PUBLICATIONS

"International Application Serial No. PCT/US2017/060660, Written Opinion dated Jan. 5, 2018", 6 pgs.
"International Application Serial No. PCT/US2017/060660, International Preliminary Report on Patentability dated May 23, 2019", 8 pgs.

* cited by examiner

END-OF-SHOW CONTENT DISPLAY TRIGGER

FIELD

The present disclosure generally relates to machines configured to the technical field of special-purpose machines that facilitate generating and displaying content including computerized variants of such special-purpose machines and improvements to such variants, and to the technologies by which such special-purpose machines become improved compared to other special-purpose machines that trigger display of content during a particular timeframe.

BACKGROUND

Conventionally, recommendations are shown to a viewer at the end of a show (e.g., television show, end of a movie, or end other types of viewable programs). This is usually done to provide the viewer with suggestions of new shows (e.g., from a video-on-demand catalog, from the user's watch list), to allow an operator to promote channels (e.g., suggest shows from a particular channel provider), or simply to improve a viewing experience for the view by providing additional or easy ways to discover more content.

An ideal time to show these recommendations may be during ending credits. Typically, the broadcast or streaming signal includes a trigger that marks a beginning of the ending credits. However, the inclusion of the marker is quite complicated and involves manually marking where the credits begin along with requiring hardware and software to encode this into the broadcast or streaming signal. Additionally, low-level software is required in a receiver device to capture the marker and pass it up from firmware, through middleware, to a user interface. Non-trivial code needs to be developed both at a headend and at multiple levels within the receiver device, which may require hardware changes. As such, some operators do not want to take this approach, and instead, display the recommendations a fixed time before the scheduled end-of-show (e.g., one minute before end-of-show).

BRIEF DESCRIPTION OF DRAWINGS

Various ones of the appended drawings merely illustrate example embodiments of the present invention and cannot be considered as limiting its scope.

DETAILED DESCRIPTION

Figure 1:
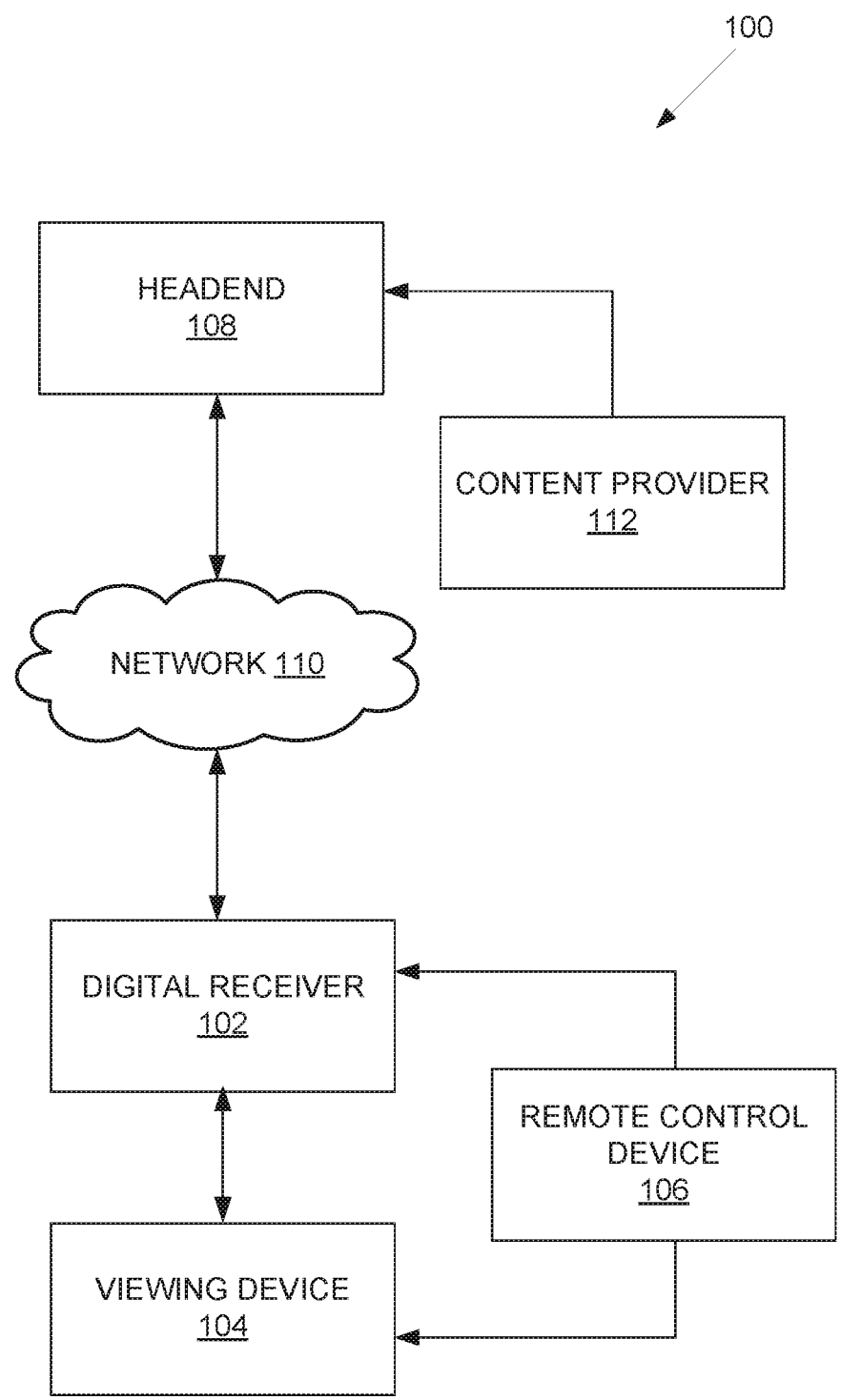
FIG. 1 is a diagram illustrating an example environment for triggering display of recommendations during an end-of-show period in accordance with an example embodiment.

The description that follows includes systems, methods, techniques, instruction sequences, and computing machine program products that embody illustrative embodiments of the present inventive subject matter. In the following description, for purposes of explanation, numerous specific details are set forth in order to provide an understanding of various embodiments of the inventive subject matter. It will be evident, however, to those skilled in the art, that embodiments of the inventive subject matter may be practiced without some or other of these specific details. In general, well-known instruction instances, protocols, structures, and techniques have not been shown in detail. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

Example methods (e.g., algorithms) facilitate triggering display of further content (e.g., recommendations) during an end-of-show period, and example systems (e.g., special-purpose machines) are configured to facilitate triggering display of further content (e.g., recommendations) during the end-of-show period. In particular, example embodiments provide mechanisms and logic that identifies an end-of-show period for a particular piece of digital content that is currently being displayed to a viewer, monitors for an environmental signal (e.g., motion indication signal from a remote control device, ambient lighting signal, ambient noise signal), and triggers display of further content (e.g., recommendations) at an appropriate time based on the environmental signal. As a result, one or more of the methodologies described herein facilitate solving the technical problem of displaying recommendations or further content at a proper time during the end-of-show period.

In a specific example embodiment, mechanisms and logic are provided that uses a particular percent completion of playback of the digital content in combination with whether the motion indication signal is received from the remote control to determine when to trigger display of the recommendations. In example embodiments, display of the recommendations is immediately triggered if the motion indication signal is detected within the end-of-show period. The end-of-show period may comprise, for example, a credits portion of the digital content or a portion near an end of the piece of digital content based on time or percentage (e.g., last 2 minutes or last 3% of the piece of digital content). If no motion indication signal is detected, some embodiments may trigger display of recommendations closer to a very end of the currently playing digital content (e.g., a predetermined time of 20 seconds from end of the digital content or a predetermined percentage completion of 99%) or show no recommendations. Alternatively, recommendations may be displayed during the end-of-show period (e.g., beginning at a particular percent completion, such as, at 97%) regardless of detecting the motion indication signal.

Use of percent completion allows for accommodating a piece of digital content's length and type (also referred to as "content type"). For example, content types such as sitcoms, documentaries, and movies may generally display credits at a different percent completion. In example embodiments, heuristics based on length and content type can be used to determine the particular percent completion where recommendations may begin to be displayed for a particular piece of content. It is noted that content type may refer to a category of programming (e.g., television show, movie, or video) as well as subject matter (e.g., genre). Using the determined percent completion, the end-of-show period is identified, which spans from a time of the determined percent completion to an end of the digital content. In an alternative embodiment, heuristics can be used to identify a particular time when recommendations may begin to be displayed—the particular time being the start of the end-of-show period.

The motion indication signal typically indicates that the remote control has been picked up by a viewer. In particular, the most typical use case is that the viewer picks up the remote control because the current show is ending. Picking up the remote control during the end-of-show period is a strong sign that the viewer is looking for something else to watch. Alternatively, picking up the remote control during the end-of-show period may indicate that the user intends to turn off a viewing device. In both use cases, this is an ideal time to show recommendations in order to keep the viewer engaged. As such, example embodiments trigger the immediate display of recommendations in response to the motion indication signal being received during the end-of-show period.

With reference to FIG. 1, a diagram illustrating an example environment 100 comprising a system for dynamically triggering display of recommendations during an end-of-show period is shown. In example embodiments, a digital receiver 102 of a user provides access to digital content. In one embodiment, the digital receiver 102 is a set-top box. The digital receiver 102 is coupled to a viewing device 104 (e.g., a television or monitor) on which the user can view the digital content. In some embodiments, the digital receiver 102 may be combined with the viewing device 104 (e.g., a smart television).

The user accesses the digital content through the digital receiver 102 using a remote control device 106. For example, the digital receiver 102 is configured to receive commands with respect to the digital content from the remote control device 106. In example embodiments, the commands include instructions to fast forward, rewind, stop, record, and pause digital content as well as to access an electronic program guide (EPG) and select digital content for viewing.

In example embodiments, the remote control device 106 comprises an accelerometer or similar mechanism that detects motion of the remote control device 106. The motion may be caused by a viewer picking up the remote control device 106, for example, to change the digital content being displayed or to turn the digital receiver 102 and viewing device 104 off. In response to detection of the motion, the remote control device 106 sends a motion indication signal to the digital receiver 102 (e.g., via an application program interface (API), using Bluetooth, or using WiFi or similar communication protocols).

If the motion indication signal is received while the currently displaying digital content is in an end-of-show period, a display of recommendations on the viewing device 104 is immediately triggered. More specifically, the digital receiver 102 immediately transmits a signal to the viewing device 104, which causes a display of recommendations (e.g., a set of recommended digital content for future viewing). The recommendations may be display in conjunction with (e.g., overlaid over or in a section of a viewable interface) credits of currently displaying digital content. The recommendations may be obtained from a headend 108 view a network 110 and comprise digital content provided by one or more content providers 112. The recommendations may also include content that is stored at, or in association with, the digital receiver (e.g., by a personal video recorder (PVR)).

Accordingly, the digital receiver 102 is configured to identify an end-of-show period for a currently displaying piece of digital content and to monitor for the motion indication signal from the remote control device 106. Components and operations of the digital receiver 102 will be discussed in more detail in connection with FIG. 2 below.

One or more portions of the network 110 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks. Any one or more portions of the network 110 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

It is noted that the environment 100 shown in FIG. 1 is merely an example. For instance, not all components of the environment 100 may be shown. Additionally, some components of the environment 100 may be combined. For example, the digital receiver 102 may be embodied within the viewing device 104 to form a single device (e.g., a smart television). Furthermore, operations discussed as occurring at the digital receiver 102 may be performed at the headend 106 or the remote control device 106.

Any of the systems or machines (e.g., databases, devices, servers) shown in FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIG. 6, and such a special-purpose computer may accordingly be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Figure 2:
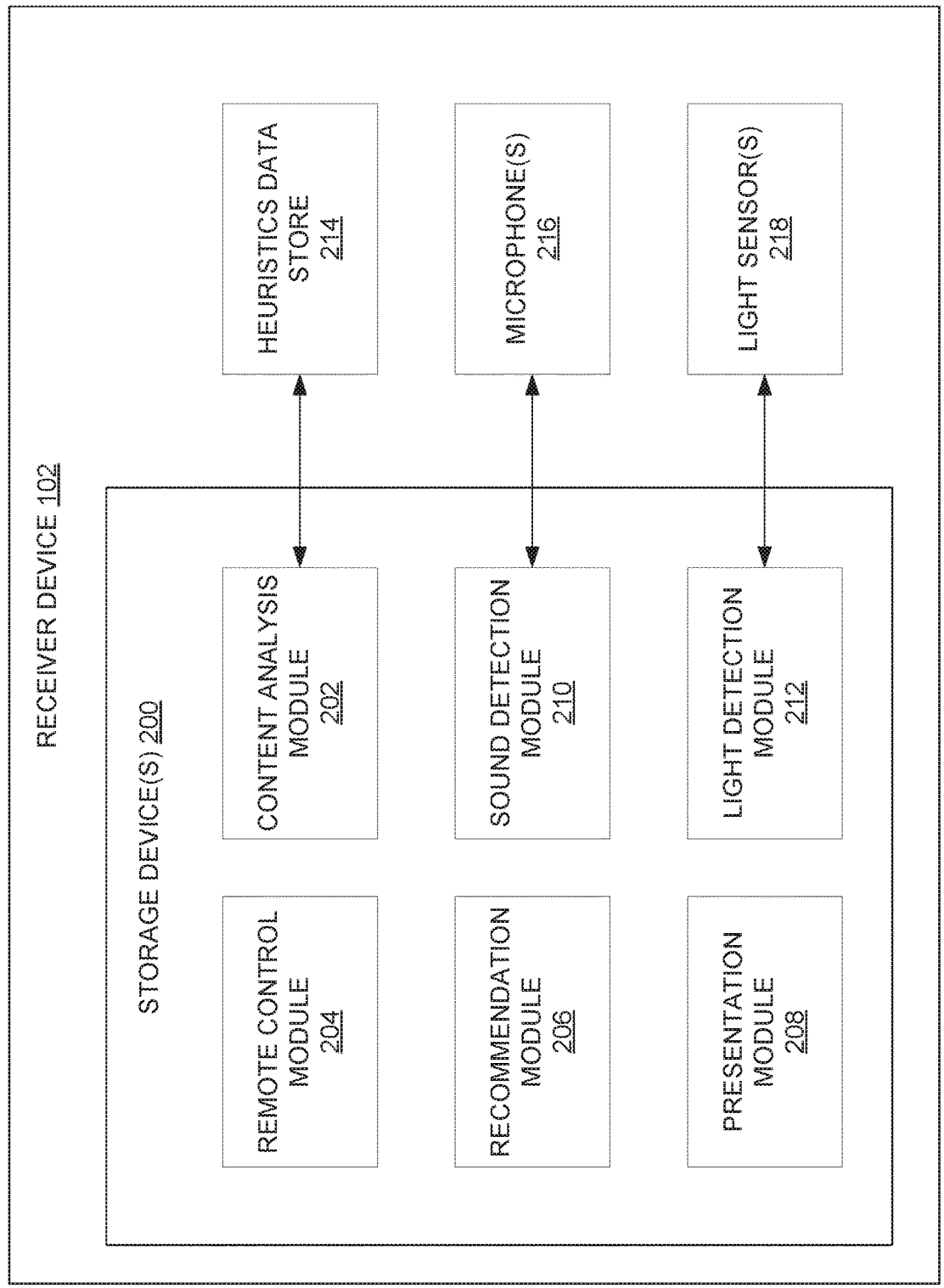
FIG. 2 is a block diagram illustrating an example embodiment of components within a digital receiver.

FIG. 2 is a block diagram illustrating an example embodiment of the digital receiver 102. The digital receiver 102 is configured to identify an end-of-show period for a piece of digital content and to determine if and when to trigger display of recommendations to a viewer of the piece of digital content. To enable these operations, the digital receiver 102 comprises one or more storage devices 200 that include a content analysis module 202, a remote control module 204, a recommendation module 206, and a presentation module 208. In some embodiments, the storage device 200 also includes one or more of a sound detection module 210 and a light detection module 212.

Any one or more of the components (e.g., modules) described herein may be implemented using hardware alone (e.g., one or more processors of a machine) or a combination of hardware and software. For example, any component described herein may physically include an arrangement of one or more of the processors or configure a processor (e.g., among one or more processors of a machine) to perform the operations described herein for that module. Accordingly, different components described herein may include and configure different arrangements of the processors at different points in time or a single arrangement of the processors at different points in time. Each component (e.g., module) described herein is an example of a means for performing the operations described herein for that component. Moreover, any two or more of these components may be combined into a single component, and the functions described herein for a single component may be subdivided among multiple components. Furthermore, according to various example embodiments, components described herein as being implemented within a single machine, database, or device may be distributed across multiple machines, databases, or devices. For example, some of the components may be embodied within the digital receiver 102 while others are embodied within the remote control device 106. The digital receiver 102 may comprise other components not pertinent to example embodiments that are not shown or discussed.

The content analysis module 202 analyzes the digital content to identify an end-of-show period for the currently playing digital content. In example embodiments, the content analysis module 202 detects a content length and content type of the digital content (e.g., from metadata for the digital content). Using the content length and content type, the content analysis module 202 accesses a heuristics data store 214 which stores information regarding digital contents and their corresponding lengths and types. The content analysis module 202 uses information from the heuristics data store 214 for similar content lengths and content types to identify a percent completion for the digital content where recommendations should start to be presented (e.g., roughly coinciding with a credits portion of the digital content). The identified percent completion corresponds to a start of an end-of-show period, whereby the end-of-show period spans from the identified percent completion to an end of the digital content.

In alternative embodiments, time can be used instead of percent completion. For example, if the digital content is a live broadcast and electronic program guide (EPG) data is accessible, then the content analysis module 202 knows a time the digital content will end (as opposed to streaming recorded or on-demand content). Alternatively, the metadata for the digital content indicates a length of the digital content. In these embodiments, the control analysis module 202 may use a particular time (e.g., two minutes from end of digital content) as a start of the end-of-show period. In some embodiments, the particular time is determined based on heuristics (e.g., by accessing data from the heuristics data store 214 for similar content).

In another alternative embodiment, image detection may be used by the content analysis module 202 to detect when credits are displayed. For example, if a threshold percent of a screen is black and/or includes scrolling text, then the control analysis module 202 determines that the credits are being displayed. As a result, the digital content is determined to be in the end-of-show period. In a further embodiment, a machine learning module is configured to detect when credits are displayed.

The remote control module 204 monitors for a motion indication signal from the remote control device 106. In example embodiments, the remote control module 204 is coupled to, or comprises, a sensor or interface that receives the motion indication signal. The motion indication signal may be received, for example, via an API, Bluetooth, WiFi, or a similar communications protocol. The motion indication signal may be generated by the remote control device 106 based on movement detected by an accelerometer of the remote control device 106 (e.g., a user picking up the remote control device 106) or be based on a selection of a button or icon on the remote control device (e.g., selection to change channel or view EPG). In response to detection of the motion indication signal, the remote control module 204 notifies the recommendation module 206 (e.g., via a signal or switch).

The recommendation module 206 determines whether or when to trigger display of recommendations. In example embodiments, the recommendation module 206 receives an indication of the end-of-show period from the content analysis module 202. The recommendation module 206 then detects when playback of the digital content has reached the end-of-show period (e.g., transgresses a start of the end-of-show period). The recommendation module 206 checks for a notification from the remote control module 204 that indicates that the motion indication signal is received. This check may occur once the end-of-show period is reached in accordance with example embodiments. Based on both playback of the piece of content being within the end-of-show period and the notification that the motion indication signal is received, the recommendation module immediately causing display of one or more recommendations of content. The one or more recommendations may be displayed, for example, overlaid over a portion of the currently playing digital content, as a pop-up user interface, or in a portion of an interface displaying the digital content (e.g., the digital content may be reduced in size and a portion used to display the recommendations).

In some embodiments, if no motion indication signal is received, the recommendation module 206 may still trigger display of recommendations, but at a later (delayed) time than if the motion indication signal is received. For example, the recommendation module 206 may trigger the display of recommendations at a predetermined percentage of completion of the playback of the piece of content that is different than the percent completion used to identify the end-of-show period. The predetermined percentage of completion occurs towards an end of the end-of-show period. For example, the percent completion used to identify the end-of-show period may be at 96% while the predetermined percentage of completion (that triggers display of recommendations in the absence of the motion indication signal) is at 99%. In another example, the recommendation module 206 may trigger the display of recommendation at a predetermined time of the playback of the piece of content, whereby the predetermined time is near the end of the end-of-show period (e.g., last 20 seconds of the show).

In example embodiments, the recommendation module 206 also retrieves or generates the recommendations (e.g., from or based on content in storage of the digital receiver 102, the headend 108, or a coupled recording device, such as a DVR). The recommendations are provided along with instructions to the presentation module 208. The presentation module 208, in example embodiments, formats the recommendations and transmits the recommendations to the viewing device 104 for display.

The sound detection module 210 analyzes sound signals to determine if a change in ambient noise level transgress a predetermined noise threshold. In particular, the sound detection module 210 receives a sound signal that is detected by one or more microphones 216. In some instances, an increase in ambient noise level is associated with an end-of-show period as one or more viewers start making noise because a main portion of the digital content (e.g., portion before the credits) is finished. In some embodiments, the sound detection module 210 considers length of the ambient noise in its analysis. For example, if the ambient noise is less than three seconds, the sound detection module 210 determines that it is not a significant change in ambient noise level and likely just background or inadvertent noise (e.g., doorbell ringing, viewer sneezing). If the ambient noise level transgresses the predetermined noise threshold, the sound detection module 210 notifies (e.g., sends a signal, triggers a switch) the recommendation module 206.

In some embodiments, the recommendation module 206 takes ambient noise level into consideration in determining if and when to display recommendations. For instant, one example embodiment may require playback be in the end-of-show period, receipt of the motion indication signal, and a change in ambient noise level that transgresses the predetermined noise threshold to trigger immediate display of recommendations. In alternative embodiments, the recommendation module 206 may trigger display of recommendation in response playback being in the end-of-show period and either receipt of the motion indication signal or the ambient noise level transgressing the predetermined noise threshold.

The light detection module 212 analyzes light signals to determine if a change in ambient lighting level transgress a predetermined lighting threshold. In particular, the light detection module 212 receives a light signal that is detected by one or more light sensors 218. In some instances, an increase in ambient lighting level is associated with an end-of-show period as a viewer turns on lights because the main portion of the digital content (e.g., portion before the credits) is finished. If the ambient lighting level transgresses the predetermined lighting threshold, the light detection module 212 notifies (e.g., sends a signal, triggers a switch) the recommendation module 206.

In some embodiments, the recommendation module 206 takes ambient lighting level into consideration in determining if and when to display recommendations. For instant, one example embodiment may require playback be in the end-of-show period, receipt of the motion indication signal, and a change in ambient lighting level that transgresses the predetermined lighting threshold to trigger immediate display of recommendations. In alternative embodiments, the recommendation module 206 may trigger display of recommendation in response playback being in the end-of-show period and either receipt of the motion indication signal or the ambient lighting level transgressing the predetermined lighting threshold.

Figure 3:
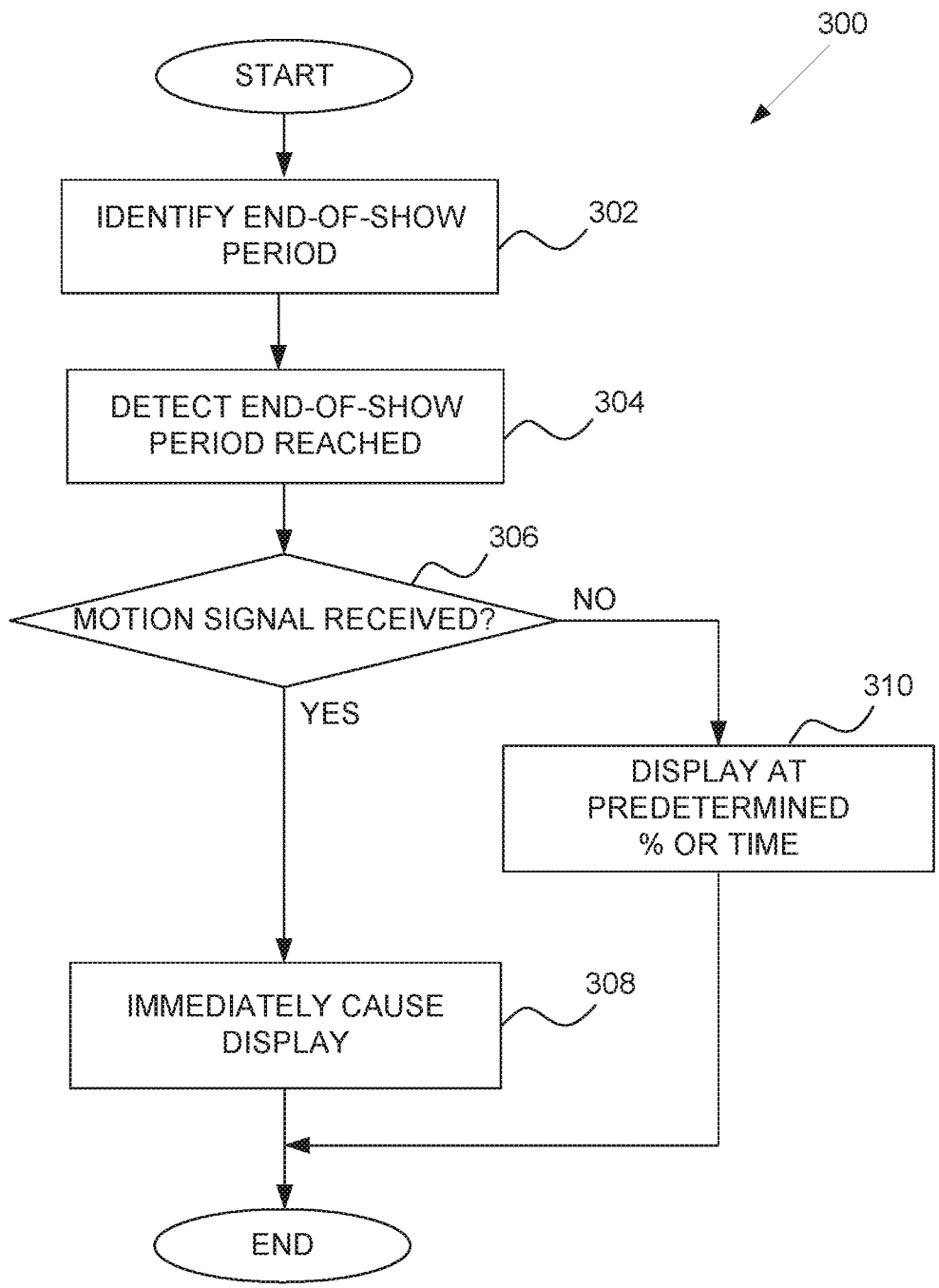
FIG. 3 is a flow diagram of an example method for triggering display of recommendations during an end-of-show period.

FIG. 3 is a flow diagram of an example method 300 for triggering display of recommendations during an end-of-show period. In example embodiments, the method 300 is performed in part or in whole by components of the digital receiver 102. Accordingly, the method 300 is described by way of example with reference to the digital receiver 102. However, it shall be appreciated that at least some of the operations of the method 300 may be deployed on various other hardware configurations or be performed by similar components residing elsewhere in the environment 100 such as at the remote control device 106. Therefore, the method 300 is not intended to be limited to the digital receiver 102.

In operation 302, an end-of-show period is identified for a piece of digital content. The end-of-show period is determined by the content analysis module 202. In some embodiments, content type and length along with heuristics is used to identify the end-of-show period for the piece of digital content. In other embodiments, metadata or EPG data is used to determine the end-of-show period. Further still, in other embodiments, image recognition may be used to analyze the digital content to identify the end-of-show period (e.g., detect when credits are presented). An example method for identifying the end-of-show period will be discussed in more detail in connection with FIG. 5 below.

In operation 304, the end-of-show period being reached is detected by the receiver device 102. In example embodiments, the recommendation module 206 detects when playback of the digital content has reached the end-of-show period (e.g., transgresses a start of the end-of-show period). Accordingly, the recommendation module 206 receives notification of the end-of-show period that is identified in operation 302 and uses that notification to identify the end-of-show period during playback.

In operation 306, a determination is made as to whether a motion indication signal has been received from the remote control device 102. In example embodiments, the remote control module 204 monitors for the motion indication signal from the remote control device 106. In example embodiments, the remote control module 204 is coupled to, or comprises, a sensor or interface that receives the motion indication signal from the remote control device 102.

If the motion indication signal is received during the end-of-show period in operation 306, the recommendations are immediately caused to be displayed in operation 308. In example embodiments, the recommendation module 206 triggers the display of the recommendation by retrieving or generating the recommendations and providing the recommendations along with instructions to display to the presentation module 208. The presentation module 208, in example embodiments, formats the recommendations and transmits the recommendations to the viewing device for display.

If in operation 306, a motion indication signal is not received, the recommendation module 206 may still trigger display of recommendations, but at a later time, in operation 310. For example, the recommendation module 206 may trigger the display of recommendations at a predetermined percentage of completion of the playback of the piece of content (e.g., at 99%) that is different than the percent completion used to identify the end-of-show period (e.g., at 97%). The predetermined percentage of completion occurs near an end of the end-of-show period. In another example, the recommendation module 206 may trigger the display of recommendation at a predetermined time of the playback of the piece of content, whereby the predetermined time is near the end of the end-of-show period (e.g., last 20 seconds of the show). In some embodiments, operation 310 is optional or removed resulting in no recommendation being presented if the motion indication signal is not received.

Figure 4:
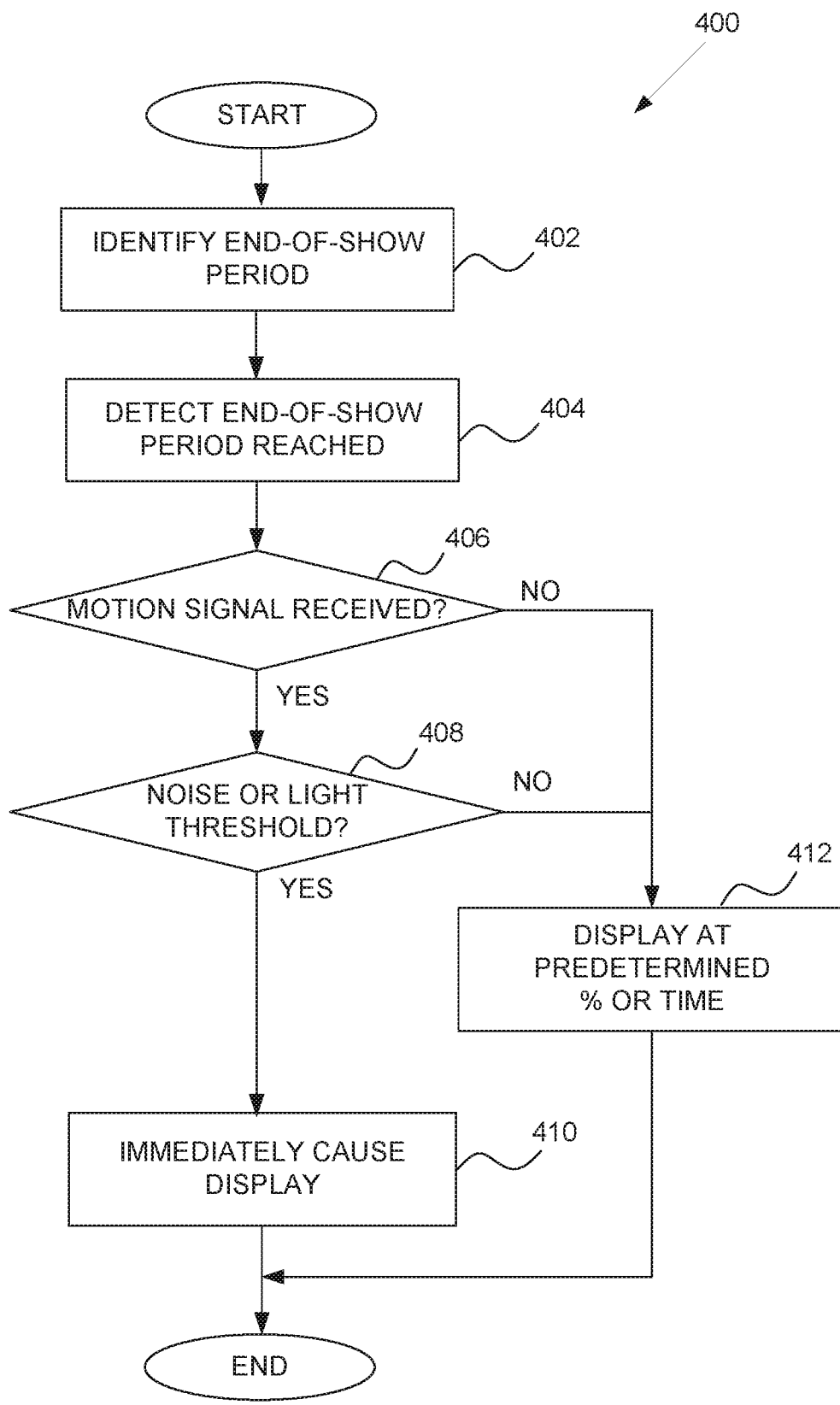
FIG. 4 is a flow diagram of an alternative method for triggering display of recommendations during an end-of-show period.

FIG. 4 is a flow diagram of an alternative method 400 for triggering display of recommendations during the end-of-show period. The method 400 takes into consideration change in ambient noise and lighting levels in determining when or whether to display recommendations. In example embodiments, the method 400 is performed in part or in whole by components of the digital receiver 102. Accordingly, the method 400 is described by way of example with reference to the digital receiver 102. However, it shall be appreciated that at least some of the operations of the method 400 may be deployed on various other hardware configurations or be performed by similar components residing elsewhere in the environment 100 such as at the remote control device 106. Therefore, the method 400 is not intended to be limited to the digital receiver 102.

In operation 402, the end-of-show period is identified by the content analysis module 202. An example method for identifying the end-of-show period will be discussed in more detail in connection with FIG. 5 below.

In operation 404, the end-of-show period being reached is detected by the receiver device 102. Accordingly, the recommendation module 206 receives notification of the end-of-show period that is identified in operation 402 and uses that notification to identify when playback of the digital content has reaches the end-of-show period.

In operation 406, a determination is made as to whether the motion indication signal has been received from the remote control device 102. In example embodiments, the remote control module 204 monitors for the motion indication signal from the remote control device 106. In example embodiments, the remote control module 204 is coupled to, or comprises, a sensor or interface that receives the motion indication signal from the remote control device 102.

If the motion indication signal is received in operation 406, then a determination is made in operation 408 as to whether an ambient noise or lighting level has changed enough to transgress a corresponding predetermined threshold. In particular, the sound detection module 210 analyzes sound signals to determine if a change in ambient noise level transgress the predetermined noise threshold, while a light detection module 212 analyzes light signals to determine if a change in ambient lighting level transgress the predetermined lighting threshold.

In response to the ambient noise or lighting level transgressing the corresponding predetermined threshold, the recommendations are immediately caused to be displayed in operation 410. In example embodiments, the recommendation module 206 triggers the display of the recommendation by obtaining or generating the recommendations and providing the recommendations along with instructions to display to the presentation module 208. The presentation module 208, in example embodiments, formats the recommendations and transmits the recommendations to the viewing device for display. In an alternative embodiment, both the ambient noise level and the ambient lighting level needs to transgress their corresponding predetermined thresholds to immediate trigger display of the recommendations.

If a motion indication signal is not received (in operation 406) and/or a noise or lighting level threshold not transgressed (in operation 408), the recommendation module 206 may still trigger display of recommendations, but at a later time, in operation 412. For example, the recommendation module 206 may trigger the display of recommendations at a predetermined percentage of completion of the playback of the piece of content (e.g., 99%) that is different than the percent completion used to identify the end-of-show period (e.g., 97%). The predetermined percentage of completion occurs towards an end of the end-of-show period. In another example, the recommendation module 206 may trigger the display of recommendation at a predetermined time of the playback of the piece of content, whereby the predetermined time is near the end of the end-of-show period (e.g., last 20 seconds of the show). In some embodiments, operation 412 is optional or removed resulting in no recommendation being presented if a motion indication signal is not received and/or the noise or lighting level threshold not transgressed.

In alternative embodiments, operation 406 may be optional or removed from the method 400. In these embodiments, immediate display of recommendations is triggered when the ambient noise or lighting level transgresses the corresponding predetermined threshold during the end-of-show period regardless of whether the motion indication signal is received from the remote control device 102.

Figure 5:
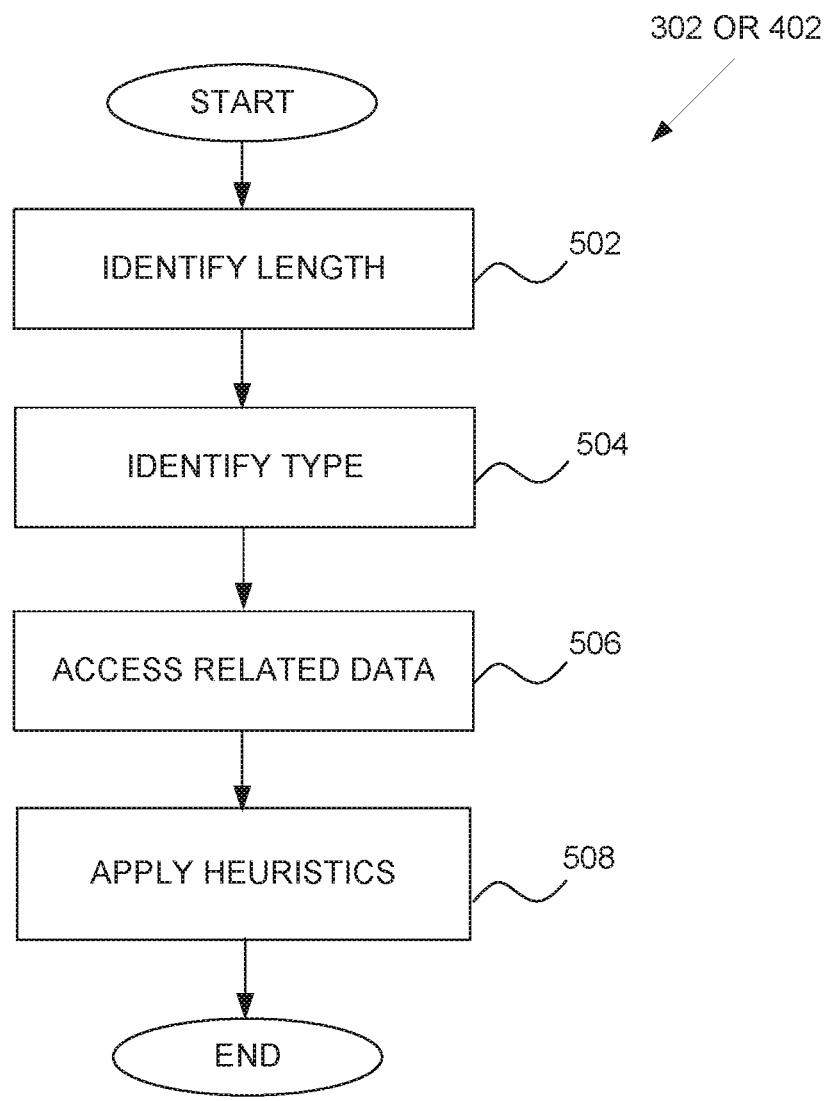
FIG. 5 is a flow diagram of an example method for identifying the end-of-show period.

FIG. 5 is a flow diagram of an example method 500 for identifying the end-of-show period. In example embodiments, the method 500 is performed in part or in whole by components of the digital receiver 102. Accordingly, the method 500 is described by way of example with reference to the digital receiver 102. However, it shall be appreciated that at least some of the operations of the method 500 may be deployed on various other hardware configurations or be performed by similar components residing elsewhere in the environment 100 such as at the remote control device 106. Therefore, the method 500 is not intended to be limited to the digital receiver 102.

In operation 502, a length of the digital content is identified while in operation 504, the content type is identified. In example embodiments, the content analysis module 202 detects a content length and content type of the digital content, for example, from metadata for the digital content. Alternatively, if the digital content is a live broadcast and electronic program guide (EPG) data is accessible, then the content analysis module 202 accesses the EPG data to identify a length of the digital content, a type of digital content, and/or a time the digital content will end.

In operation 506, related data is accessed by the content analysis module 202. In example embodiments, the content analysis module 202 accesses data from the heuristics data store 214. For example, using the content length and content type, the content analysis module 202 accesses the heuristics data store 214 which stores information regarding digital contents and their corresponding lengths and types.

In operation 508, heuristics processing is applied to identify the end-of-show period. The content analysis module 202 uses information from the heuristics data store 214 for similar content lengths and types to identify a percent completion for the digital content where recommendations may start to be presented (e.g., the start of the end-of-show period). Alternatively, the content analysis module 202 uses the information from the heuristics data store 214 for similar content lengths and types to identify a particular time as the start of the end-of-show period.

Figure 6:
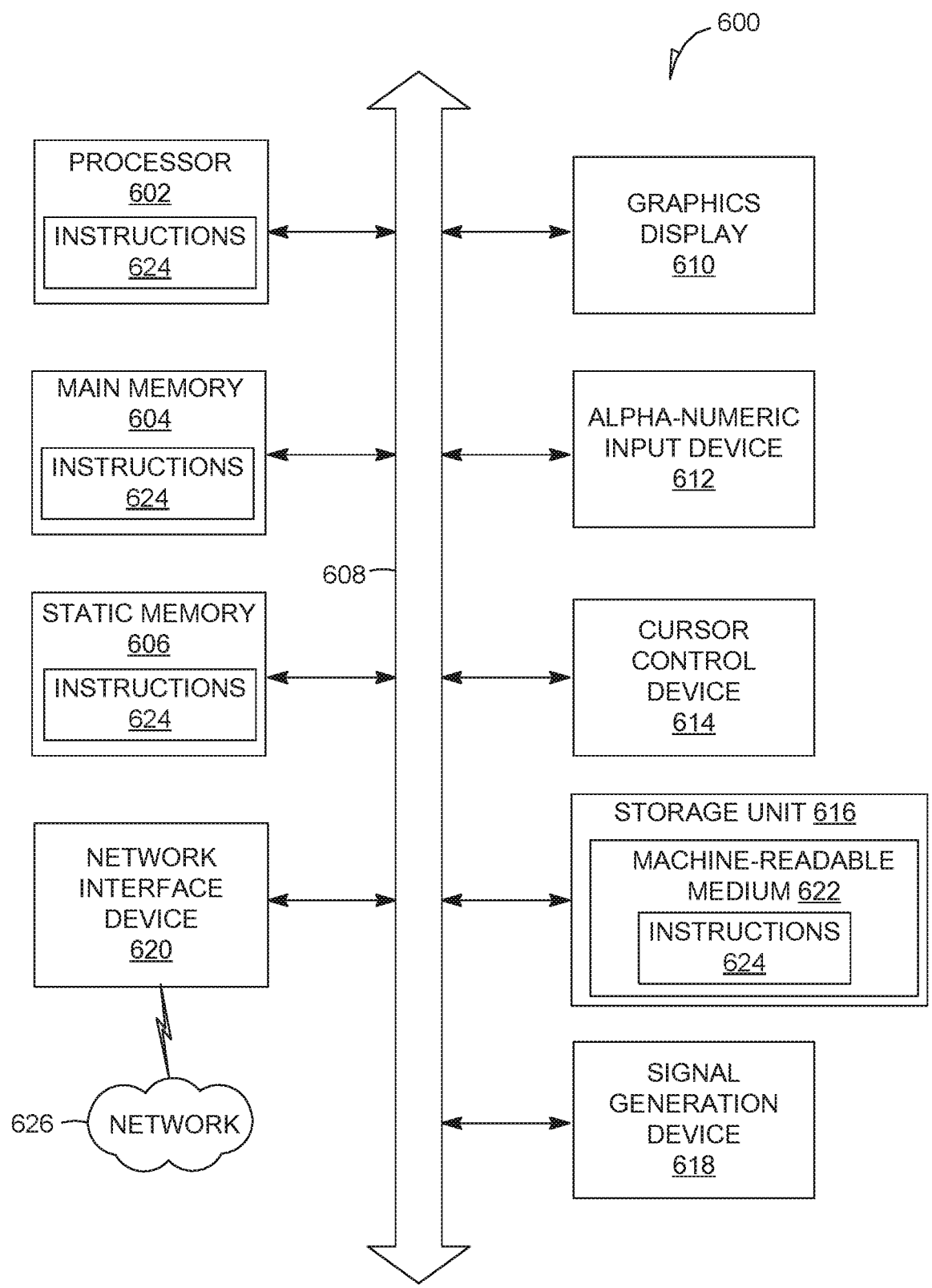
FIG. 6 is a diagrammatic representation of a machine in an example form of a computing system within which a set of instructions may be executed for causing the machine to perform any one or more of the methodologies discussed herein, according to an example embodiment.

FIG. 6 is a block diagram illustrating components of a machine 600, according to some example embodiments, able to read instructions 624 from a machine-readable medium 622 (e.g., a non-transitory machine-readable medium, a machine-readable storage medium, a computer-readable storage medium, or any suitable combination thereof) and perform any one or more of the methodologies discussed herein, in whole or in part. Specifically, FIG. 6 shows the machine 600 in the example form of a computer device (e.g., a computer) within which the instructions 624 (e.g., software, a program, an application, an applet, an app, or other executable code) for causing the machine 600 to perform any one or more of the methodologies discussed herein may be executed, in whole or in part.

For example, the instructions 624 may cause the machine 600 to execute the flow diagrams of FIGS. 3, 4, and 5. The instructions 624 can transform the general, non-programmed machine 600 into a particular machine (e.g., specially configured machine) programmed to carry out the described and illustrated functions in the manner described.

In alternative embodiments, the machine 600 operates as a standalone device or may be connected (e.g., networked) to other machines. The machine 600 may be a server computer, a client computer, a personal computer (PC), a tablet computer, a laptop computer, a netbook, a set-top box (e.g. STB), a personal digital assistant (PDA), a cellular telephone, a smartphone, a web appliance, a network router, a network switch, a network bridge, a power adapter, or any machine 600 capable of executing the instructions 624, sequentially or otherwise, that specify actions to be taken by that machine 600. Further, while only a single machine 600 is illustrated, the term "machine" shall also be taken to include a collection of machines that individually or jointly execute the instructions 624 to perform any one or more of the methodologies discussed herein.

The machine 600 includes a processor 602 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 604, and a static memory 606, which are configured to communicate with each other via a bus 608. The processor 602 may contain microcircuits that are configurable, temporarily or permanently, by some or all of the instructions 624 such that the processor 602 is configurable to perform any one or more of the methodologies described herein, in whole or in part. For example, a set of one or more microcircuits of the processor 602 may be configurable to execute one or more modules (e.g., software modules) described herein.

The machine 600 may further include a graphics display 610 (e.g., a plasma display panel (PDP), a light emitting diode (LED) display, a liquid crystal display (LCD), a projector, a cathode ray tube (CRT), or any other display capable of displaying graphics or video). The machine 600 may also include an alphanumeric input device 612 (e.g., a keyboard or keypad), a cursor control device 614 (e.g., a mouse, a touchpad, a trackball, a joystick, a motion sensor, an eye tracking device, or other pointing instrument), a storage unit 616, a signal generation device 618 (e.g., a sound card, an amplifier, a speaker, a headphone jack, or any suitable combination thereof), and a network interface device 620.

The storage unit 616 includes the machine-readable medium 622 (e.g., a tangible machine-readable storage medium) on which are stored the instructions 624 embodying any one or more of the methodologies or functions described herein. The instructions 624 may also reside, completely or at least partially, within the main memory 604, within the processor 602 (e.g., within the processor's cache memory), or both, before or during execution thereof by the machine 600. Accordingly, the main memory 604 and the processor 602 may be considered machine-readable media 622 (e.g., tangible and non-transitory machine-readable media).

In some example embodiments, the machine 600 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium 622 able to store data temporarily or permanently and may be taken to include, but not be limited to, random-access memory (RAM), read-only memory (ROM), buffer memory, flash memory, and cache memory. While the machine-readable medium 622 is shown, in an example embodiment, to be a single medium, the term "machine-readable medium" should be taken to include a single medium or multiple media (e.g., a centralized or distributed database, or associated caches and servers) able to store instructions 624. The term "machine-readable medium" shall also be taken to include any medium, or combination of multiple media, that is capable of storing instructions 624 for execution by a machine (e.g., machine 600), such that the instructions 624, when executed by one or more processors of the machine 600 (e.g., processor 602), cause the machine 600 to perform any one or more of the methodologies described herein. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof. In some embodiments, a "machine-readable medium" may also be referred to as a "machine-readable storage device" or a "hardware storage device."

Furthermore, the machine-readable medium 622 is non-transitory in that it does not embody a propagating or transitory signal. However, labeling the machine-readable medium 622 as "non-transitory" should not be construed to mean that the medium is incapable of movement—the medium should be considered as being transportable from one physical location to another. Additionally, since the machine-readable medium 622 is tangible, the medium may be considered to be a machine-readable storage device.

Furthermore, the machine-readable medium 622 does not comprise any transitory signals. In some example embodiments, the instructions 624 for execution by the machine 600 may be communicated by a carrier medium. Examples of such a carrier medium include a storage medium (e.g., a non-transitory machine-readable storage medium, such as a solid-state memory, being physically moved from one place to another place) and a transient medium (e.g., a propagating signal that communicates the instructions 624)

The instructions 624 may further be transmitted or received over a communications network 626 using a transmission medium via the network interface device 620 and utilizing any one of a number of well-known transfer protocols (e.g., HTTP). Examples of communication networks 626 include a local area network (LAN), a wide area network (WAN), the Internet, mobile telephone networks, plain old telephone service (POTS) networks, and wireless data networks (e.g., WiFi, LTE, and WiMAX networks). The term "transmission medium" shall be taken to include any intangible medium that is capable of storing, encoding, or carrying instructions 624 for execution by the machine 600, and includes digital or analog communications signals or other intangible medium to facilitate communication of such software.

Example 1 is a method for triggering display of recommendations during an end-of-show period. The method comprises identifying an end-of-show period for a piece of digital content, whereby the end-of-show period indicates a portion at an end of the piece of digital content during which display of recommendations can be triggered; monitoring for a motion indication signal from a remote control device; and, in response to both playback of the piece of digital content being within the end-of-show period and a determination that the motion indication signal is received, immediately causing display of one or more recommendations of further digital content.

In example 2, the subject matter of example 1 can optionally include receiving the motion indication signal from the remote control device, wherein the motion indication signal indicates movement of the remote control device.

In example 3, the subject matter of examples 1-2 can optionally include receiving the motion indication signal from the remote control device, wherein the motion indication signal indicates a selection of a button on the remote control device.

In example 4, the subject matter of examples 1-3 can optionally include detecting, using one or more light sensors, an increase in ambient lighting and determining that a change in an ambient lighting level transgresses a predetermined lighting threshold, wherein the immediately causing display of the one or more recommendations of further digital content is based on the change in the ambient lighting level transgressing the predetermined lighting threshold in combination with the playback of the piece of digital content being within the end-of-show period and the determination that the motion indication signal is received.

In example 5, the subject matter of examples 1-4 can optionally include detecting, using one or more sound sensors, an increase in ambient noise and determining that a change in an ambient noise level transgresses a predetermined noise threshold, wherein the immediately causing display of the one or more recommendations of further digital content is based on the change in the ambient noise level transgressing the predetermined noise threshold in combination with the playback of the piece of digital content being within the end-of-show period and the determination that the motion indication signal is received.

In example 6, the subject matter of examples 1-5 can optionally include, in response to both the playback of the piece of digital content being within the end-of-show period and a determination that the motion indication signal is not received, causing display of the one or more recommendations of further digital content at a predetermined percentage of completion of the playback of the piece of digital content, wherein the predetermined percentage of completion occurs near an end of the end-of-show period.

In example 7, the subject matter of examples 1-6 can optionally include, in response to both playback of the piece of digital content being within the end-of-show period and a determination that the motion indication signal is not received, causing display of the one or more recommendations of further digital content at a predetermined time during the playback of the piece of digital content, wherein the predetermined time is near an end of the end-of-show period.

In example 8, the subject matter of examples 1-7 can optionally include identifying a length of the piece of digital content, identifying a content type for the piece of digital content, and applying heuristics, based on the length and content type, to identify the end-of-show period.

In example 9, the subject matter of examples 1-8 can optionally include wherein the identifying the end-of-show period for the piece of digital content comprises identifying a particular percent completion of playback for the piece of digital content, the end of show period spanning a timeframe from the particular percent completion of playback of the piece of digital content to an end of the piece of digital content.

In example 10, the subject matter of examples 1-9 can optionally include wherein the identifying the end-of-show period for the piece of digital content comprises identifying a particular time of playback based on electronic program guide data or metadata, the end of show period spanning a timeframe from the particular time of playback of the piece of digital content to an end of the piece of digital content.

Example 11 is a hardware storage device storing instructions which, when executed by the at least one processor of a machine, cause the machine to perform operations. The operations comprise identifying an end-of-show period for a piece of digital content, whereby the end-of-show period indicates a portion at an end of the piece of digital content during which display of recommendations can be triggered; monitoring for a motion indication signal from a remote control device; and, in response to both playback of the piece of digital content being within the end-of-show period and a determination that the motion indication signal is received, immediately causing display of one or more recommendations of further digital content.

In example 12, the subject matter of example 11 can optionally include detecting, using one or more light sensors, an increase in ambient lighting, and determining that a change in an ambient lighting level transgresses a predetermined lighting threshold, wherein the immediately causing display of one or more recommendations of further digital content is based on the change in the ambient lighting level transgressing the predetermined lighting threshold in combination with the playback of the piece of digital content being within the end-of-show period and the determination that the motion indication signal is received.

In example 13, the subject matter of examples 11-12 can optionally include detecting, using one or more sound sensors, an increase in ambient noise, and determining that a change in an ambient noise level transgresses a predetermined noise threshold, wherein the immediately causing display of one or more recommendations of further digital content is further based on the change in the ambient noise level transgressing the predetermined noise threshold in combination with the playback of the piece of digital content being within the end-of-show period and the determination that the motion indication signal is received In example 14, the subject matter of examples 11-13 can optionally include, in response to both the playback of the piece of digital content being within the end-of-show period and a determination that the motion indication signal is not received, causing display of the one or more recommendations of further digital content at a predetermined percentage of completion of the playback of the piece of digital content, the predetermined percentage of completion occurring near an end of the end-of-show period.

In example 15, the subject matter of examples 11-14 can optionally include in response to both playback of the piece of digital content being within the end-of-show period and a determination that the motion indication signal is not received, causing display of the one or more recommendations of further digital content at a predetermined time during the playback of the piece of digital content, the predetermined time being near an end of the end-of-show period.

In example 16, the subject matter of examples 11-15 can optionally include wherein the identifying the end-of-show period for the piece of digital content comprises identifying a length of the piece of digital content, identifying a content type for the piece of digital content, and applying heuristics, based on the length and content type, to identify the end-of-show period.

Example 17 is a system for triggering display of recommendations during an end-of-show period. The system includes one or more processors configured to perform operations comprising identifying an end-of-show period for a piece of digital content, the end-of-show period indicating a portion at an end of the piece of digital content during which display of recommendations can be triggered; monitoring for a motion indication signal from a remote control device; and, in response to both playback of the piece of digital content being within the end-of-show period and a determination that the motion indication signal is received, immediately causing display of one or more recommendations of further digital content.

In example 18, the subject matter of example 17 can optionally include wherein the operations further comprise identifying a length of the piece of digital content, identifying a content type for the piece of digital content, and applying heuristics, based on the length and content type, to identify the end-of-show period.

In example 19, the subject matter of examples 17-18 can optionally include wherein the identifying the end-of-show period for the piece of digital content comprises identifying a particular percent completion of playback for the piece of digital content, the end of show period spanning a timeframe from the particular percent completion of playback of the piece of digital content to an end of the piece of digital content.

In example 20, the subject matter of examples 17-19 can optionally include wherein the identifying the end-of-show period for the piece of digital content comprises identifying a particular time of playback based on electronic program guide data or metadata, the end of show period spanning a timeframe from the particular time of playback of the piece of digital content to an end of the piece of digital content.

In example 21, the subject matter of examples 17-20 can optionally include wherein the end-of-show period comprises a credits portion of the piece of digital content.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium 622 or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor 602 or a group of processors 602) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the inventive subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:
    identifying an end-of-show period for a piece of first digital content, the end-of-show period corresponding to a portion at an end of the piece of first digital content during which to present one or more recommendations of second digital content, the identifying the end-of-show period comprising:
        identifying one or more first attributes of the piece of first digital content, the one or more first attributes including a length of the piece of first digital content or a content type for the piece of first digital content;
        identifying, from a data store, data for further digital content having one or more second attributes that are similar to the one or more first attributes of the piece of first digital content; and
        using the data from the data store, determining a beginning of the end-of-show period for the piece of first digital content;
    upon determining that the playback of the piece of first digital content has reached the end-of-show period, initiating, by a hardware processor, a monitoring process to check for receipt of a signal indicating that a remote control device has been moved from a first location to a second location by the user; and
    causing presentation of the one or more recommendations of the second digital content in response to the receipt, during the end-of-show period, of the signal indicating that the remote control device has been moved from the first location to the second location by the user.

2. The method of claim 1, wherein the signal indicating that the remote control device has been moved from the first location to the second location by the user is generated by an accelerometer.

3. The method of claim 1, further comprising receiving an indication of a selection of a button on a remote control device.

4. The method of claim 1, further comprising:
    detecting, using one or more light sensors, an increase in ambient lighting; and
    determining that a change in an ambient lighting level transgresses a predetermined lighting threshold, wherein the causing presentation of the one or more recommendations of the second digital content is based on the change in the ambient lighting level transgressing the predetermined lighting threshold in combination with the receipt of the signal indicating that the remote control device has been moved from the first location to the second location by the user.

5. The method of claim 1, further comprising:
    detecting, using one or more sound sensors, an increase in ambient noise; and
    determining that a change in an ambient noise level transgresses a predetermined noise threshold, wherein the causing presentation of the one or more recommendations of the second digital content is based on the change in the ambient noise level transgressing the predetermined noise threshold in combination with the receipt of the signal indicating that the remote control device has been moved from the first location to the second location by the user.

6. The method of claim 1, further comprising, in response to both the playback of the piece of first digital content being within the end-of-show period and a determination that the signal indicating that the remote control device has been moved from the first location to the second location by the user is not received, causing display of the one or more recommendations of the second digital content at a predetermined percentage of completion of the playback of the piece of first digital content.

7. The method of claim 1, further comprising, in response to both playback of the piece of first digital content being within the end-of-show period and a determination that the signal indicating that the remote control device has been moved from the first location to the second location by the user is not received, causing display of the one or more recommendations of the second digital content at a predetermined time during the playback of the piece of first digital content.

8. The method of claim 1, wherein:
the identifying the data about further digital content having one or more second attributes that are similar to the one or more first attributes of the piece of first digital content comprises
using the length or content type of the piece of first digital content to identify heuristic data for the further digital content having the one or more second attributes; and
the determining the beginning of the end-of-show period comprises determining a percent completion of playback for the first digital content where recommendations can start to be presented.

9. The method of claim 1, wherein:
the identifying the data about further digital content having one or more second attributes that are similar to the one or more first attributes of the piece of first digital content comprises
using the length or content type of the piece of first digital content to identify heuristic data for the further digital content having the one or more second attributes; and
the determining the beginning of the end-of-show period comprises determining a time of playback for the first digital content where the one or more recommendations can start to be presented.

10. The method of claim 1, wherein the identifying the end-of-show period for the piece of first digital content further comprises identifying a particular time of playback based on electronic program guide data or metadata indicating a length of the piece of first digital content, the particular time of playback being a predetermined amount of time from an end of the piece of first digital content based on the length, the end of show period spanning a timeframe from the particular time of playback of the piece of first digital content to the end of the piece of first digital content.

11. A hardware storage device storing instructions that, when executed by one or more processors of a machine, cause the machine to perform operations comprising:
identifying an end-of-show period for a piece of first digital content, the end-of-show period corresponding to a portion at an end of the piece of first digital content during which to present one or more recommendations of second digital content, the identifying the end-of-show period comprising:
identifying one or more first attributes of the piece of first digital content, the one or more first attributes including a length of the piece of first digital content or a content type for the piece of first digital content;
identifying, from a data store, data about further digital content having one or more second attributes that are similar to the one or more first attributes of the piece of first digital content; and
using the data from the data store, determining a beginning of the end-of-show period for the piece of first digital content;
upon determining that the playback of the piece of first digital content has reached the end-of-show period, initiating a monitoring process to check for receipt of a signal indicating that a remote control device has been moved from a first location to a second location by the user; and causing presentation of the one or more recommendations of the second digital content in response to the receipt, during the end-of-show period, of the signal indicating that the remote control device has been moved from the first location to the second location by the user.

12. The hardware storage device of claim 11, wherein the operations further comprise:
detecting, using one or more light sensors, an increase in ambient lighting; and
determining that a change in an ambient lighting level transgresses a predetermined lighting threshold, wherein the causing presentation of one or more recommendations of the second digital content is based on the change in the ambient lighting level transgressing the predetermined lighting threshold in combination with the receipt of the signal indicating that the remote control device has been moved from the first location to the second location by the user.

13. The hardware storage device of claim 11, wherein the operations further comprise:
detecting, using one or more sound sensors, an increase in ambient noise; and
determining that a change in an ambient noise level transgresses a predetermined noise threshold, wherein the causing presentation of one or more recommendations of the second digital content is further based on the change in the ambient noise level transgressing the predetermined noise threshold in combination with the receipt of the signal indicating that the remote control device has been moved from the first location to the second location by the user.

14. The hardware storage device of claim 11, wherein the operations further comprise, in response to both the playback of the piece of first digital content being within the end-of-show period and a determination that the signal indicating that the remote control device has been moved from the first location to the second location by the user is not received, causing display of the one or more recommendations of the second digital content at a predetermined percentage of completion of the playback of the piece of digital content.

15. The hardware storage device of claim 11, wherein the operations further comprise, in response to both playback of the piece of first digital content being within the end-of-show period and a determination that the signal indicating that the remote control device has been moved from the first location to the second location by the user is not received, causing display of the one or more recommendations of the second digital content at a predetermined time during the playback of the piece of digital content.

16. The hardware storage device of claim 11, wherein:
the identifying the data about further digital content having one or more second attributes that are similar to the one or more first attributes of the piece of first digital content comprises
using the length or content type of the piece of first digital content to identify heuristic data for the further digital content having the one or more second attributes; and
the determining the beginning of the end-of-show period comprises determining a percent completion or a time of playback for the first digital content where the one or more recommendations can start to be presented.

17. A system comprising:
one or more hardware processors; and
a storage device storing instructions that configure the one or more hardware processors to perform operations comprising:

identifying an end-of-show period for a piece of first digital content, the end-of-show period corresponding to a portion at an end of the piece of first digital content during which to present one or more recommendations of second digital content, the identifying the end-of-show period comprising:
  identifying one or more first attributes of the piece of first digital content, the one or more first attributes including a length of the piece of first digital content or a content type for the piece of first digital content;
  identifying, from a data store, data about further digital content having one or more second attributes that are similar to the one or more first attributes of the piece of first digital content; and
  using the data from the data store, determining a beginning of the end-of-show period for the piece of first digital content;
upon determining that the playback of the piece of first digital content has reached the end-of-show period, initiating a monitoring process to check for receipt of a signal indicating that a remote control device has been moved from a first location to a second location by the user; and
causing presentation of the one or more recommendations of the second digital content in response to the receipt, during the end-of-show period, of the signal indicating that the remote control device has been moved from the first location to the second location by the user.

18. The system of claim 17, wherein:
the identifying the data about further digital content having one or more second attributes that are similar to the one or more first attributes of the piece of first digital content comprises
using the length or content type of the piece of first digital content to identify heuristic data for the further digital content having the one or more second attributes; and
the determining the beginning of the end-of-show period comprises determining a percent completion of playback for the first digital content where the one or more recommendations can start to be presented.

19. The system of claim 17, wherein:
the identifying the data about further digital content having one or more second attributes that are similar to the one or more first attributes of the piece of first digital content comprises using the length or content type of the piece of first digital content to identify heuristic data for the further digital content having the one or more second attributes; and
the determining the beginning of the end-of-show period comprises determining a time of playback of the piece of first digital content where the one or more recommendations can start to be presented.

20. The system of claim 17, wherein the end-of-show period comprises a credits portion of the piece of first digital content.

* * * * *